No. 832,833. PATENTED OCT. 9, 1906.
R. BAGGALEY.
METHOD OF EXTRACTING METAL VALUES FROM ORES.
APPLICATION FILED DEC. 4, 1905.

WITNESSES
Thomas W. Bakewell
R A Balderson.

INVENTOR
Ralph Baggaley

No. 832,833. PATENTED OCT. 9, 1906.
R. BAGGALEY.
METHOD OF EXTRACTING METAL VALUES FROM ORES.
APPLICATION FILED DEC. 4, 1905.

WITNESSES
Thomas W. Bakewell
R A Balauson

INVENTOR
Ralph Baggaley

No. 832,833. PATENTED OCT. 9, 1906.
R. BAGGALEY.
METHOD OF EXTRACTING METAL VALUES FROM ORES.
APPLICATION FILED DEC. 4, 1905.

WITNESSES
Thomas W. Bakewell
R A Balderson

INVENTOR
Ralph Baggaley

UNITED STATES PATENT OFFICE.

RALPH BAGGALEY, OF PITTSBURG, PENNSYLVANIA.

METHOD OF EXTRACTING METAL VALUES FROM ORES.

No. 832,833.     Specification of Letters Patent.     Patented Oct. 9, 1906.

Application filed December 4, 1905. Serial No. 290,095.

*To all whom it may concern:*

Be it known that I, RALPH BAGGALEY, of Pittsburg, Allegheny county, Pennsylvania, have invented a new and useful Method of Extracting Metal Values from Ores, of which the following is a full, clear, and exact description, reference being had to the accompanying drawings, forming part of this specification, in which—

My invention provides a method by which to successfully perform a new process of simultaneously smelting and extracting values by liquation or sweating from a large proportion of ores in which actual fusion is not necessary to extract the values. This result is cheaply accomplished because the use of carbonaceous fuel is unnecessary. It renders available for commercial use vast bodies of low-grade ores that are now worthless.

To start the process, it is necessary to provide a bath of molten matte, preferably derived from an outside source, although, if preferred, it may be melted within the vessel itself. It should be sufficient to fill the vessel with matte up to the level of the overflow-spout, and it is preferably derived from a simple melting with the least possible concentration of ores that are rich in iron, sulfur, and other oxidizable elements and compounds. A converting-blast is then driven into the bath of molten matte, which produces heat, and thereafter ores are fed into the apparatus either continuously or intermittently, as may be preferred. If increased heat is desired in the bath, sulfids are fed. If mineral values are desired, these are usually best obtainable from ores of a silicious nature. Care should be taken to provide and maintain a molten bath that contains sufficient iron, sulfur, and other oxidizable elements and compounds to constantly supply the heat necessary to produce success. Thereafter silicious ores are fed into the furnace, and these are fused to the point where the iron in the matte after oxidation will form selective slag at minimum temperatures, (much less than the temperatures that ordinarily prevail in blast-furnace work,) and thereafter an excess of silicious ores may be fed onto the molten bath, and these float submerged or partially submerged in matte the entire length of the vessel, subjected to the heat and the agitation produced by a converting-blast, so that their mineral contents, usually existing in the form of occluded particles of sulfid, are sweated out, join the molten bath of matte, and are recovered, while the liquated worthless silicious shells are discharged with slag and matte into the forehearth at a lower level. In the latter vessel the matte-prills are very thoroughly separated from the worthless slag and silicious-ore shells under favorable conditions that guarantee an excellent recovery.

The liquating or sweating out of mineral from various cupreous materials is not a new art in metallurgy, if carbonaceous fuel be utilized to produce and to maintain the necessary heat. It is, however, radically new and is much more economical to practice the liquation in the apparatus described in my present invention in which no carbonaceous fuel is used. In using this apparatus I preferably crush the ores to a small size—say to the size of a walnut—preheat them to a temperature less than that at which sulfid fuses, and deliver them into the furnace, as illustrated in the drawings. The fines I treat for the thorough recovery of their contained values, preferably as described in United States Patent No. 766,654, issued August 2, 1904, in application Serial No. 235,418, filed December 5, 1904, or in other ways. Converter-slags may also be delivered into this apparatus as a thorough, quick, and economical means of extracting their contained mineral values.

Figure 1:
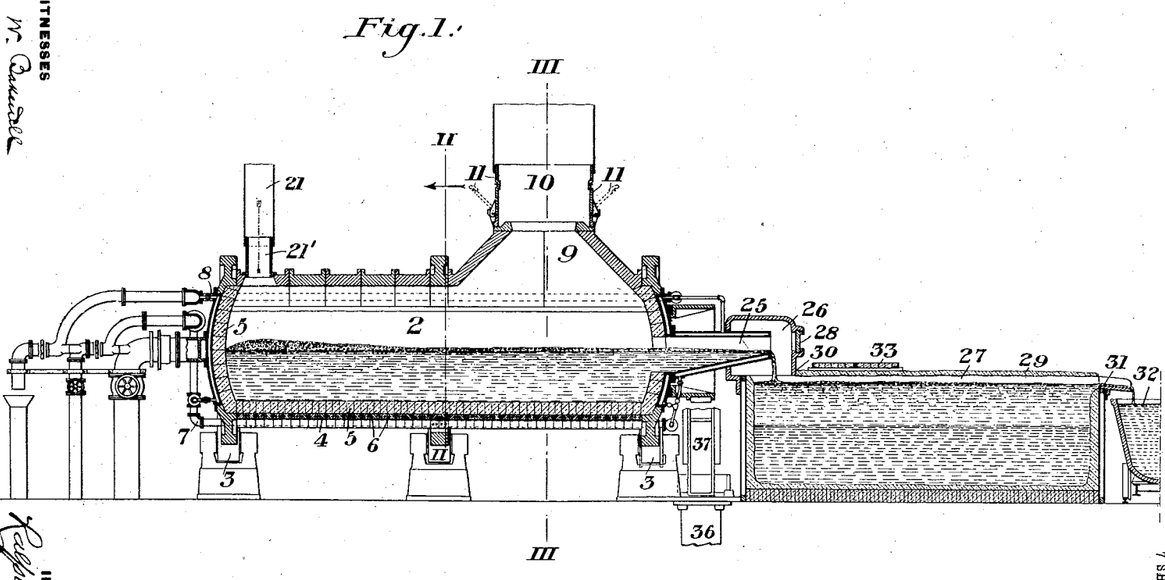
Figure 1 illustrates a longitudinal section on the line I I of Fig. 2 of my preferred form of apparatus for practicing the invention.
Figure 2:
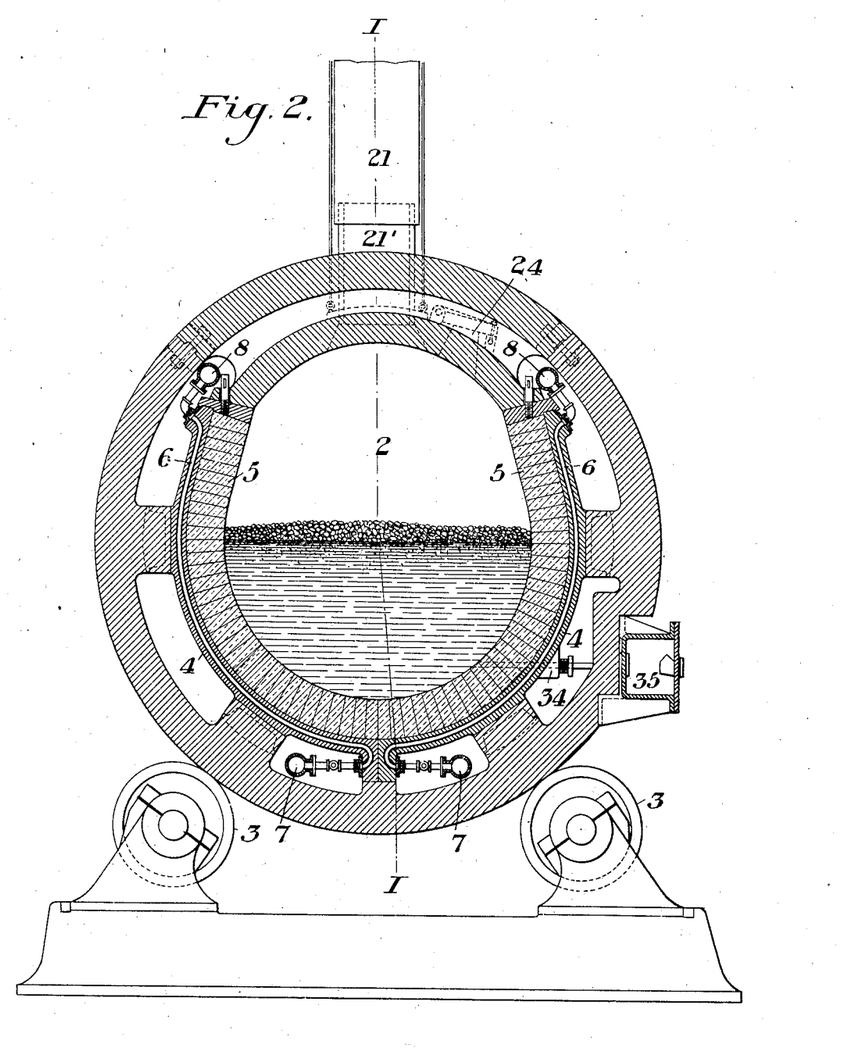
Fig. 2 illustrates a cross-section on the line II II of Fig. 1.
Figure 3:
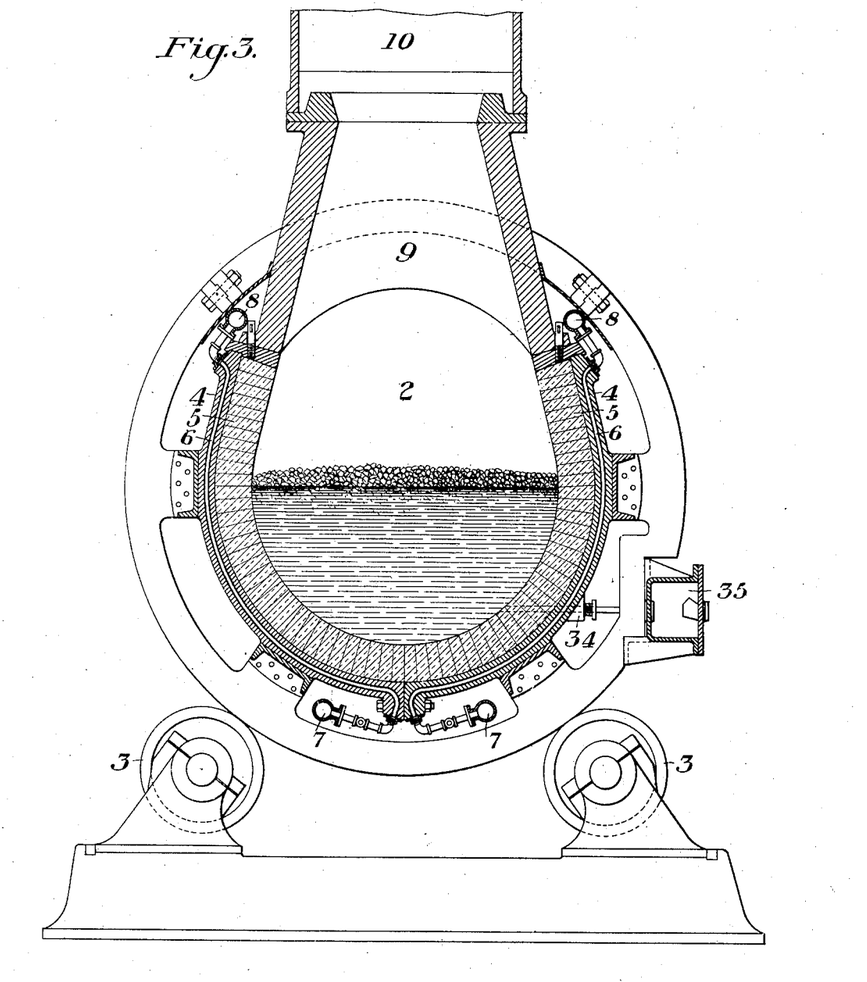
Fig. 3 illustrates a cross-section on the line III III of Fig. 1.
Figure 6:
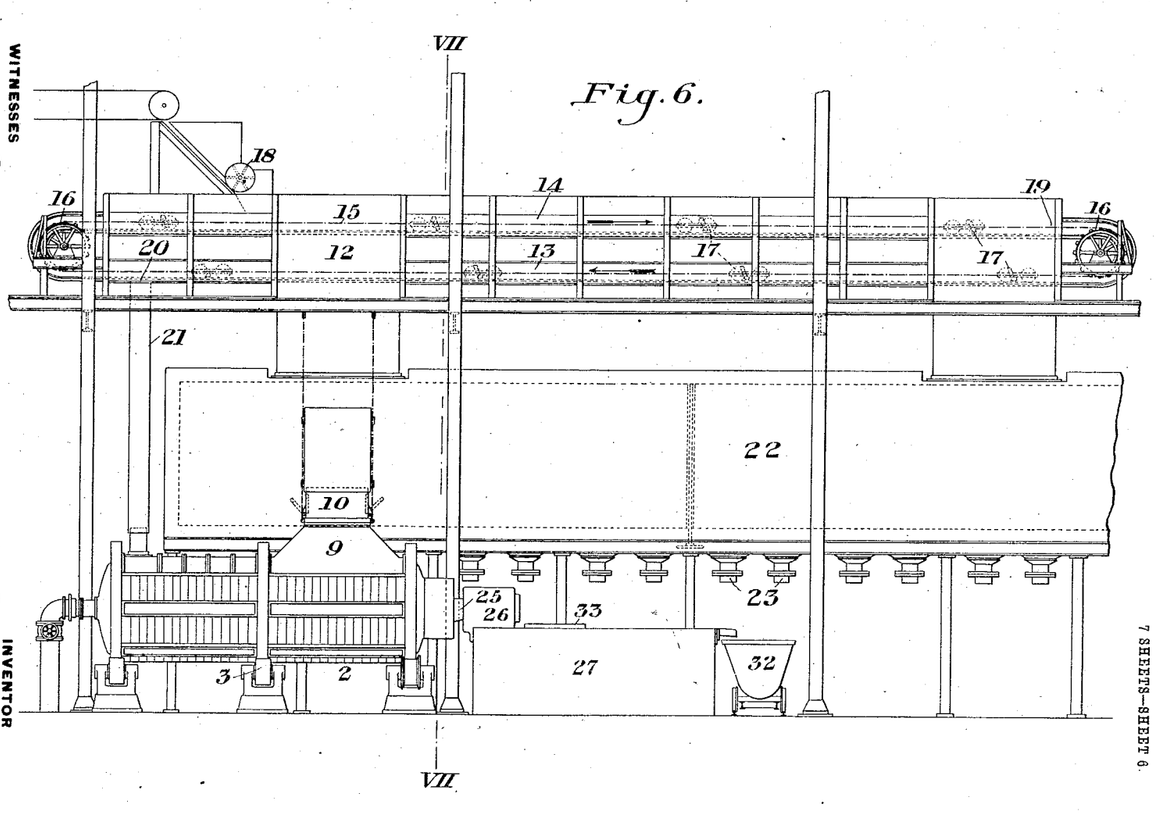
Fig. 6 is a side elevation showing the device which I prefer to employ for preheating the ore.
Figure 7:
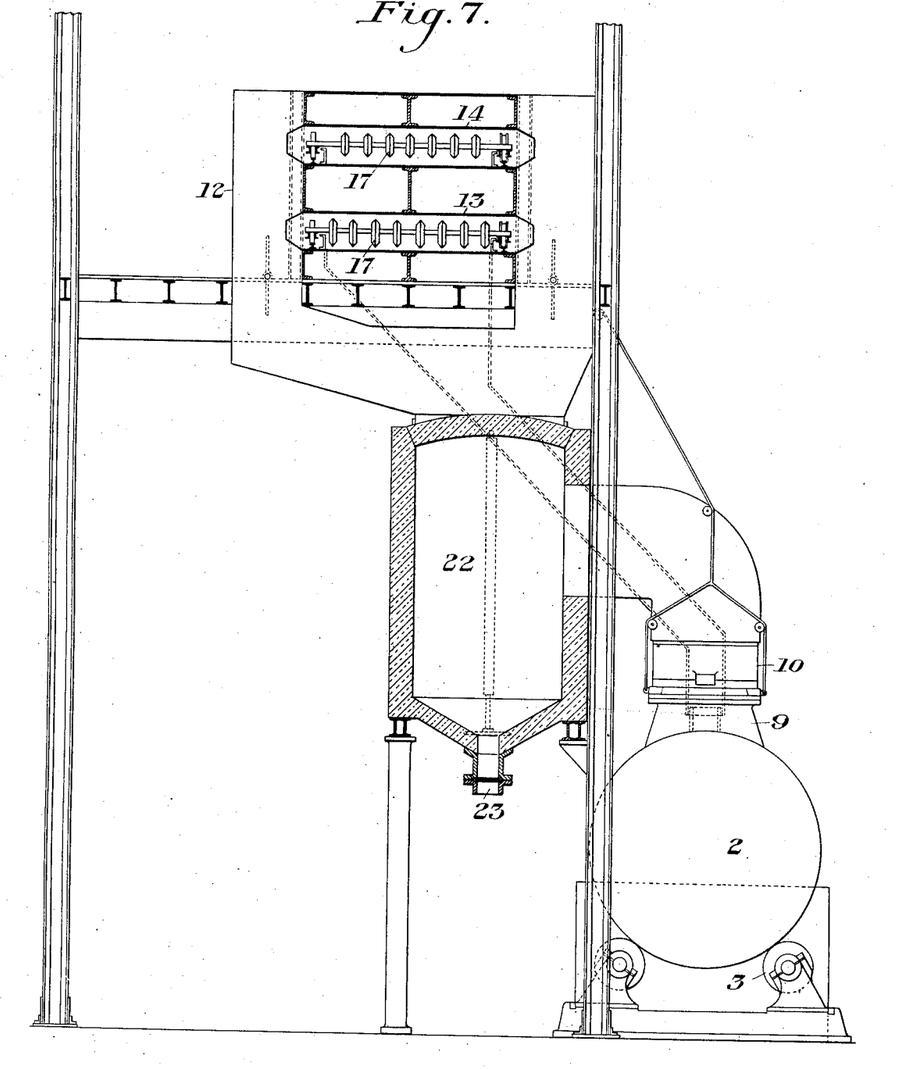
Fig. 7 is a vertical cross-section on the line VII VII of Fig. 6.

My preferred apparatus, as shown in Figs. 1, 2, and 3, comprises a converter which is rotatably mounted, preferably upon rollers or a cradle, and is preferably made of cylindrical form of greater length than diameter. As above stated, this furnace is mounted on rollers 3 3 and has an exterior metal shell 4 and an interior refractory lining 5, the metal shell being preferably provided with water-cooling pipes 6, through which streams of water are maintained for the purpose of placing a limit upon the extent to which the interior basic lining can be destroyed by the molten contents of the vessel. The water enters the cooling-pipes 6 from mains 7 7 at the lowest point of the converter and passes upwardly therefrom, and thence discharges into elevated mains 8 8, thus preventing the possibility of the formation of steam-pockets. The converter 2 is provided with a throat 9 for the escape of gases, and this throat communicates with a telescopic pipe 10, through which the gases pass to a stack. The lower section of the pipe 10 is preferably provided with doors 11 to afford means for removing congealed slag from the interior of the throat 9. During the operation of the converter the lowest section 10 of the telescopic pipe is preferably dropped into position upon the throat 9, as shown in Fig. 1, so as to exclude the air, and thus prevent any cooling influence upon the hot gases of the converter. These gases may thence be led to a suitable preheater, in which the ore to be charged into the converter may be heated to a point less than the fusion-point of sulfid. This preheating has the effect of expelling moisture from the ores and also heats them to an important extent, thus materially increasing the smelting capacity of the converter. The preheater, however, need not be used, and in such case the gases may be led directly into dust-chambers, in which the dust, often rich in metal values, may be collected. I illustrate such preheater in Fig. 6, in which 12 represents a hollow chamber, into which the gases discharge from the converter. This chamber is of considerable length and contains two sub-chambers 13 14, one above the other, in which the branches of an endless chain extend, this endless chain 15 passing around sprockets 16 and having stirrers 17 for propelling the ore. The ore is introduced into the upper chamber 14 through a feeding device 18 and is carried through such chamber in the direction of the arrow by the endless chain until it comes to a drop 19, where it drops into the lower chamber 13 and is there engaged again by the stirrers on the endless chain and is carried in the direction of the lower arrow to a second drop 20, at which it drops into the feed-tube 21, which leads to the converter. The gases from the converter surround the chambers 13 and 14, as shown in Fig. 7, through which the ore is passing, and thus heat the ore to a considerable temperature, but short of that at which the sulfids of the ore can be fused. When it is not desired to pass the gases from the converter through the preheater, they can be diverted directly through the dust-chamber 22 into the stack-flue. The flue-dust from the dust-catcher 22 may be removed from time to time through openings 23 at its base.

The converter is preferably about twenty feet in length and eight feet in diameter. At one end, as above stated, it is provided with the pipe 21, through which ore is introduced, and with adjacent openings 24, through which molten matte may be introduced. At the other end of the furnace is the outlet 9 for the gases and an overflow-spout 25 for the escape of the molten matte and the slag and silicious shells. This spout 25 is preferably water-jacketed, as the volume of material that passes through it is very great and it is desirable to water-jacket it in order to prevent injury by reason of the cutting action of the flowing material. 26 is a practically air-tight metal drop-tube, through which the molten slag and matte and the silicious shells flow together out of the overflow-spout into the forehearth 27. The drop-tube 26 is provided with an opening 28, through which the overflow-spout may be watched by the operator, and when necessary may be quickly and thoroughly rodded. This opening affords means for raking out and dropping into the forehearth any chilled accretions that may form. It is provided with a heavy metal door which may be of any convenient size and is preferably in the form of a circle, so that it may be rolled to one side for the purpose of opening. By reason of the use of the open overflow-spout 25 the level of the bath in the converter is limited, and the forehearth affords a free discharge for the slag and shells and prevents any trapping of the blast, such as prevails in ordinary blast-furnace practice, and also prevents the accumulation of a body of floating slag which always exists in any form of apparatus in which the blast is trapped.

29 represents a congealed slag-covering, which forms over the forehearth and constitutes a practically air-tight union at 30 with the metal drop-tube 26. When the operation of the converter is started and when sufficient matte and slag have accumulated to fill the forehearth to the top level, a clay plug or dam is preferably placed in the slag-discharge 31 of the forehearth, and after the chilled covering 29 has been formed this clay dam is removed and the overflowing slag then finds a ready outlet to the slag-pot 32 or other receptacle in which it is received.

The forehearth is preferably very large—say twenty feet in diameter if circular or eight to ten feet wide by twenty feet in length if rectangular in form. It provides a long travel for the slag and matte in molten condition and for the floating liquated ore through the forehearth and underneath the congealed slag-covering, in order thus to secure a further separation of all mineral and matte. This has the effect of conserving the heat to a much greater degree than exists in present practice, it causes an exceptionally clean separation of all matte-prills that may be mingled with the slag, and, owing to the intense heat and the consequent fluidity of the slag, a better percentage of separation occurs. By this means the floating lumps of silicious ore are also afforded additional opportunity for sweating or liquation under favorable conditions. When ultimately discharged from the forehearth, both the molten slag and the floating silica lumps are exceptionally clean.

A bridge 33 is preferably placed over the forehearth in order to afford a platform on which the workmen may work. Owing to the differences which characterize my process from those heretofore practiced, this bridge is almost a necessity, because the corrosive nature of the matte in the forehearth is such that it eats away the slag covering and renders it too frail for the workmen with safety to stand upon it, as is the case in ordinary practice.

The converter is provided with twyers 34, fed from a suitable wind-box 35. The converter is also provided with suitable means (shown at 36 and 37 in Fig. 1) for rotating it on the rollers 3 3. The purpose of rotating it is that in case of accident, when it is desired to empty the contents of the converter, this may be done by lifting the telescopic section 21' at the base of the pipe 21 and the telescopic section 10 at the base of the outlet for the gases and then inverting the converter and discharging its molten contents, thus preventing the same from freezing in the vessel. The molten contents of the forehearth should be tapped out at the same time in such event, since otherwise its contents would also solidify and would have to be dug out before operations could be resumed.

In the use of the apparatus a bath of molten matte is provided in the vessel, as above stated, this matte being preferably of low grade and preferably not exceeding twenty per cent. in values. Such bath is rich in iron, sulfur, and other oxidizable elements and compounds and is necessarily very hot, liquid, and corrosive. When this bath has been formed, air is blown into it through the twyers 34 and silicious ore is introduced through the opening 21. This ore will float upon the matte, part of it will be taken up by fluxing with the iron, and the remainder will be cracked by the heat and will yield up its metal values to the bath. This action is due to the fact that the temperature of the molten bath—the temperature which must always exist in order to keep it molten—is greatly in excess of the fusing-point of the sulfur contained in the ore and is also in excess of the most difficultly-fusible sulfid constituent of the ore and is greater than the fusing-point of the arsenids, antimonids, &c. The consequence is that these sulfids, arsenids, &c., which represent the mineral constituents of the ore, are freed by fusion from the ore when the silicious shell of the latter is cracked by the heat, and being thus freed they pass into and become a part of the molten bath, while the worthless silicious shells remain unfused and pass off with the slags into the forehearth. The greater the length of the apparatus the longer will be the travel of the floating ore immersed in the bath from the point of entrance at one end to the point of discharge through the overflow-spout at the other end. Ores as found in nature are quite different physically. Some will yield up their values by liquation more quickly than others. The length of the vessel must be governed by the characteristics of the ores to be treated. The latter should remain in the bath for a long enough period to have their occluded minerals separated from the gangue, so that they will join the molten bath of matte before the worthless silicious shells are discharged into the forehearth; otherwise a useless waste of values will occur. The difference in characteristics of the ores, therefore, must regulate their sojourn in the molten bath, and this sojourn can alone be governed by the length of the furnace and the rate of feed. It will be found cheaper in practice to increase the length of the furnace rather than to reduce its producing capacity by checking the feed. The rate of feed may be regulated as desired. Within certain limits a long travel for the floating ore is desirable; but no good can result from making this travel greater than is found in practice to accomplish a clean separation. The size of the vessel will govern the volume of initial bath, which must cover the converting-twyers to start the process. An adequate volume of blast must also be provided.

In the use of the apparatus the gases in the converter are at a considerable pressure, which is desirable because it helps to maintain the high temperature in the converter necessary for carrying out the process. Because of the pressure of the gases the several openings of the converter, such as the joint at the pipes 10 and 21' and also the molten-slag-charging opening 24, should be tightly closed.

Figure 4:
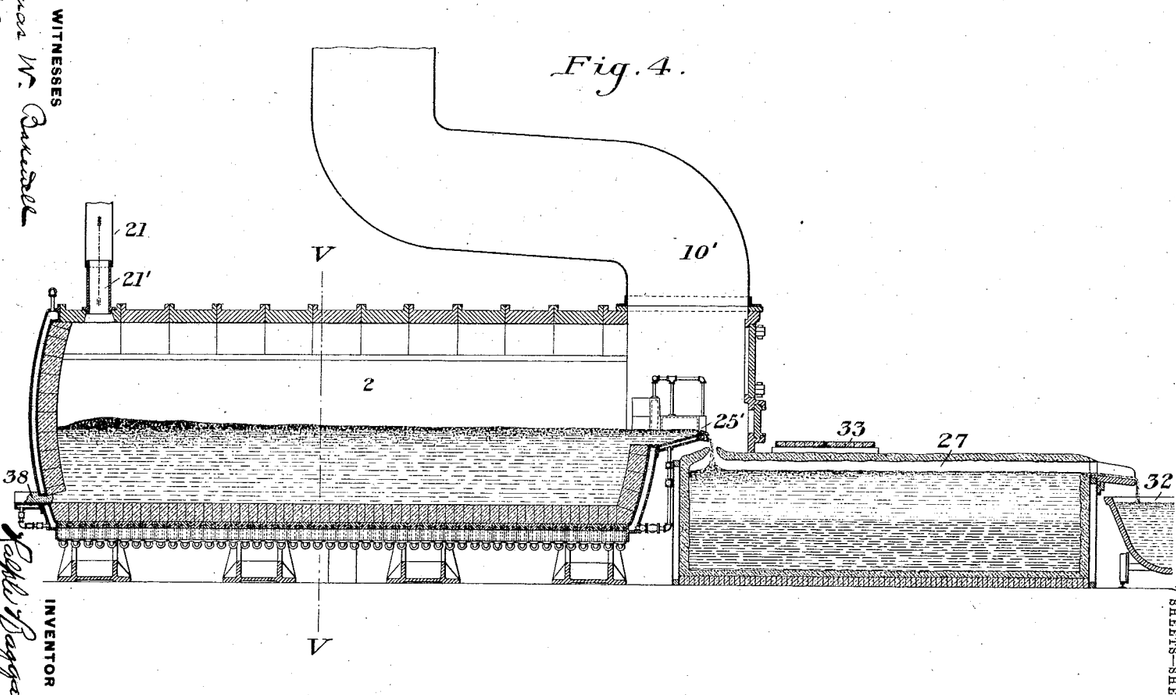
Fig. 4 is a vertical longitudinal section showing my alternate form of apparatus, in which the converter is fixed and is not rotary, as in the previous figures.
Figure 5:
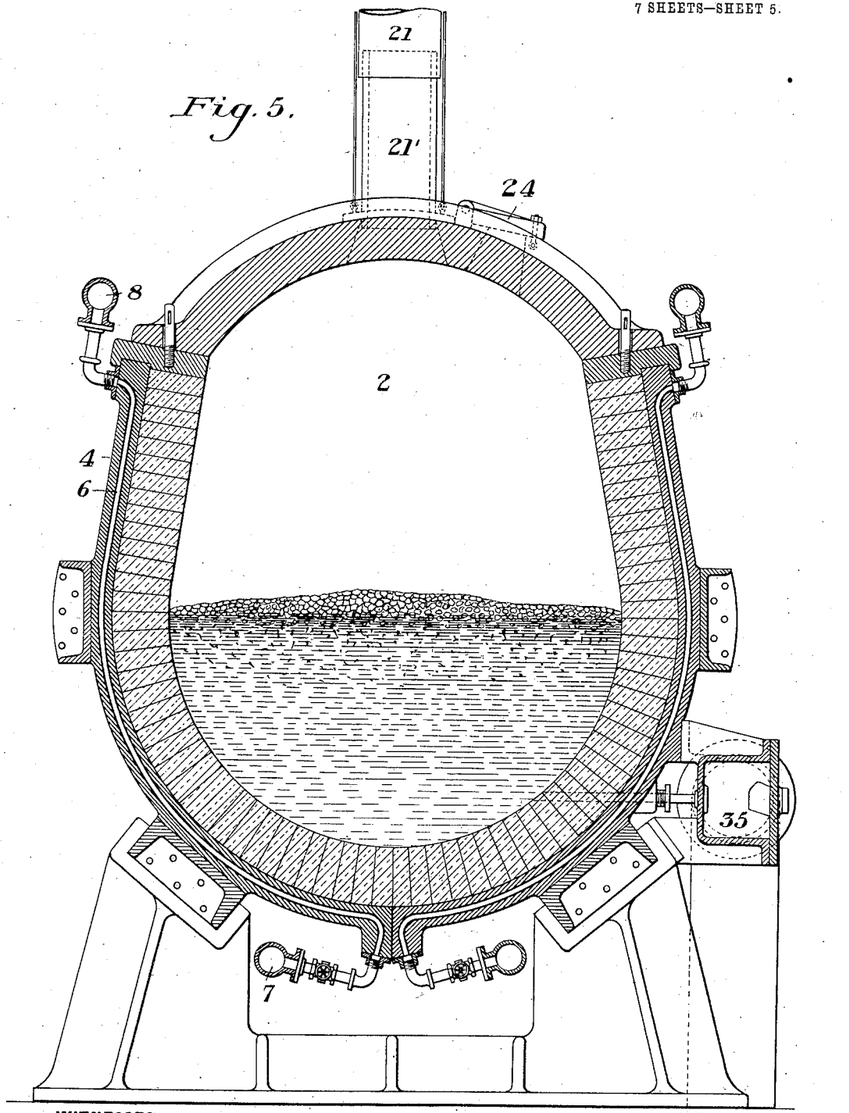
Fig. 5 is a vertical cross-section, on a larger scale, on the line V V of Fig. 4.

In the modified construction of apparatus shown in Figs. 4 and 5 the converter is stationary and is designed for use where a greater length is desired. Being stationary, it may conveniently be made of forty or even sixty feet in length, whereas with the rotatable apparatus about twenty feet in length represents the practical limit. In this case the stack-flue 10' leads out of the converter directly above the overflow-spout 25', so that the whole discharging end of the converter above the level of the bath is open to the stack. As the vessel shown in Figs. 4 and 5 cannot be tipped for the purpose of discharging the molten contents, I provide a tap-hole 38 at the end and at its lower level. Attention is called to the fact that where the apparatus is fixed the twyers must be provided with metal plugs in order to prevent them from filling with congealed matte when the blast from any cause is shut off.

Within the scope of my invention as defined in the claims the steps of the process may be modified and apparatus of other forms may be used, since

What I claim is—

1. The method of extracting metal values from ores through liquation without carbonaceous fuel, which consists in feeding silicious ore to a bath of molten matte in excess of the amount that will flux with the constituents of the bath, and causing the excess portions of the ore to yield their values to the bath by liquation; substantially as described.

2. The method of extracting metal values from ores through liquation without carbonaceous fuel, which consists in feeding silicious ore to a bath of molten matte in excess of the amount that will flux with the constituents of the bath, blowing air into the bath, and causing the excess portions of the ore to yield their values to the bath by liquation; substantially as described.

3. The method of extracting metal values from ores through liquation without carbonaceous fuel, which consists in feeding silicious ores to a molten bath of matte at a temperature which will flux a portion of the silica of the ore with the iron of the matte, but which will leave unfused the residual and unfluxed portions of the ore whereby such unfluxed portions of the ore are caused to yield their values to the bath by liquation; substantially as described.

4. The method of extracting metal values from silicious ores which consists in feeding such ore into a molten bath of matte, extracting values from the ore and permitting the residue of the ore while subjected to the heat of conversion to escape through an overflow-spout; substantially as described.

5. The method of extracting metal values from silicious ores, which consists in preheating such ore, feeding it into a molten bath of low-grade matte, extracting values from the ore and permitting the residue of the ore to float to a point of discharge into a separating vessel; substantially as described.

6. The method of extracting metal values from silicious ores, which consists in preheating such ore, dropping it into a molten bath of low-grade matte, extracting values from the ore and permitting the residue of the ore to escape with slag and matte into a separating vessel at a lower level; substantially as described.

7. The method of extracting metal values from silicious ores, which consists in preheating such ore, feeding it into a molten bath of low-grade matte, extracting values from the ore and permitting the residue of the ore to escape with slag and matte into a separating vessel at a lower level and to float with slag over a body of matte to a point of discharge; substantially as described.

8. The method of extracting metal values from silicious ores, which consists in feeding such ore into a molten bath of low-grade matte, extracting values from the ore, and permitting the residue of the ore to escape with slag and matte into a separating vessel at a lower level and to float with slag over a body of low-grade matte to a point of discharge and maintaining in the separating vessel a practically air-tight congealed slag covering; substantially as described.

9. The method of extracting metal values from silicious ores, which consists in feeding such ore into a molten bath of low-grade matte at one end of a converting vessel, permitting the ore to float while subjected to the heat of conversion to a point of discharge at the other end of the vessel, subjecting the surface of the molten bath to the influence of hot gases throughout the length of their travel, extracting values from the ore and permitting the residue of the ore to drop with molten matte and slag through an untrapped overflow-spout into a separating vessel at a lower level, through a practically air-tight drop-tube that excludes the chill of the atmosphere and thereafter permitting such residue to float over a body of low-grade matte in the forehearth to a point of discharge underneath a chilled slag covering that will maintain the heat and the fluidity of the bath, until the worthless slag and silica shells of the liquated ore are discharged, substantially as described.

10. The method of liquating ores, which consists in feeding them into a molten bath of matte, creating and maintaining heat by blowing an air-blast into the matte and providing a discharge for the fused and unfused material; substantially as described.

11. The method of liquating ores on a molten bath of matte which consists in feeding ore onto the matte, allowing the fused and unfused ore to discharge after it has remained in contact with the molten bath a sufficient length of time to liquate the values from the unfused portions; substantially as described.

12. The method of liquating ores on a molten bath of matte, which consists in blowing air into the bath, feeding ore onto the matte that contains more silica than can be fluxed by the iron that is set free from the matte through the action of the blast of air, and discharging the unfused portions after having remained in the furnace a sufficient length of time to become liquated; substantially as described.

13. The method of liquating values from highly silicious ores which consists in feeding the ore onto a body of molten matte, blowing air into the bath, fusing a portion of the ore by the heat produced from the oxidation of the sulfur and iron, allowing the slag thus produced to flow with the matte and liquating the suspended and unfused pieces of ore prior to their discharge with matte and slag; substantially as described.

14. The method of liquating ores which consists in extracting their values by subjecting them to the heat produced by the conversion of matte, permitting them to float from one end to the other of an elongated vessel containing the matte, and during such travel liquefying the contained values and a portion of the slag-making materials and discharging them from the converting vessel before all of the gangue of the ore is fused; substantially as described.

15. The method of liquating ores which consists in extracting the values from such as contain matte-making material or precious metals by subjecting them to the heat derived from the oxidation of oxidizable compounds of metal, until sufficient acids have combined with the bases to form a fusible slag and permitting the excess of the acids to discharge in an unfused state with molten slag and matte; substantially as described.

16. The method of liquating ores which consists in supplying to a furnace sufficient oxidizable compounds of metal to maintain a liquid bath of matte, blowing air into the molten bath, feeding onto it ores carrying more acid than base, permitting these materials to remain in the vessel for a sufficient time to enable the acid in the ore to combine with the oxids of the bases to form a liquid slag and discharging the excess of silica in an unfused condition with molten slag and matte; substantially as described.

17. The method of liquating ores which consists in separating the bases from the acids by means of heat without producing a perfect fusion of all the acids, subjecting the raw ore to the oxidizing action of the converting-blast in a converting-furnace, fusing all the matte-making material it contains and a sufficient amount of the slag-making material contained in the ore to permit the fused portions to hold the unfused portions in suspension and to float them through the overflow-spout out of the vessel; substantially as described.

18. The method of extracting mineral values from ores by liquation, which consists in providing a bath of low-grade matte in a suitable furnace, blowing air thereinto, forming a union of a portion of the bases and other slag-making material with a portion of the acids through the heats of oxidation, discharging the slag and unfused liquated ores together with any matte which is formed in excess of the amount required to keep the vessel full to the overflow-spout and discharging these together into a forehearth for separation; substantially as described.

19. The method of liquating ores which consists in maintaining a continuous bath of low-grade matte in a converter, feeding silicious ore thereinto in excess of the amount that will flux with the matte, and removing the slag as it is melted and the unfused excess silica as it is liquated; substantially as described.

20. The method of liquating ores which consists in providing a converting-furnace with a bath of low-grade matte, blowing air thereinto, producing heat thereby, feeding ore onto the surface of the molten bath at one end of the vessel in excess of the portion that can be melted through the formation of selective slags, permitting the molten slag, matte and silicious liquated shells to overflow continuously into a forehearth at a lower level for separation by gravity, whereby the molten slag and the silicious-ore shells are discharged from the surface of the matte-bath so rapidly by the action of gravity and by the agitation produced by the entering blast that the ore charges on entering the vessel are insured an intimate, instantaneous and a continuous contact with the low-grade, fiery, corrosive matte from the time of their entrance into the vessel to the time of their discharge through an overflow-spout into the forehearth for subsequent separation by gravity; substantially as described.

In testimony whereof I have hereunto set my hand.

RALPH BAGGALEY.

Witnesses:
 GEO. B. BLEMING,
 D. E. JAERMAN.